(12) United States Patent
Wilenski et al.

(10) Patent No.: US 10,821,672 B2
(45) Date of Patent: *Nov. 3, 2020

(54) METHODS FOR ADDITIVE MANUFACTURING

(71) Applicant: The Boeing Company, Chicago, IL (US)

(72) Inventors: Mark Stewart Wilenski, Mercer Island, WA (US); Samuel F. Harrison, Bothell, WA (US); Nick Shadbeh Evans, Lynnwood, WA (US); Faraón Torres, Everett, WA (US)

(73) Assignee: The Boeing Company, Chicago, IL (US)

( * ) Notice: Subject to any disclaimer, the term of this patent is extended or adjusted under 35 U.S.C. 154(b) by 482 days.

This patent is subject to a terminal disclaimer.

(21) Appl. No.: 15/642,787

(22) Filed: Jul. 6, 2017

(65) Prior Publication Data

US 2019/0009471 A1 Jan. 10, 2019

(51) Int. Cl.
*B29C 64/314* (2017.01)
*B29C 64/165* (2017.01)
(Continued)

(52) U.S. Cl.
CPC .......... *B29C 64/314* (2017.08); *B29C 64/118* (2017.08); *B29C 64/141* (2017.08);
(Continued)

(58) Field of Classification Search
CPC ..... B29C 64/165; B29C 70/16; B29C 70/205; B29C 70/38; B29C 70/382; B29C 70/386
See application file for complete search history.

(56) References Cited

U.S. PATENT DOCUMENTS

| 3,600,272 A | 8/1971 | Cortigene et al. |
| 3,813,976 A | 6/1974 | Greer |

(Continued)

FOREIGN PATENT DOCUMENTS

| CN | 103817937 | 5/2014 |
| DE | 201310103973 | 10/2014 |

(Continued)

OTHER PUBLICATIONS

Machine generated English translation of CN 103817937, dated Mar. 26, 2018.

(Continued)

*Primary Examiner* — Atul P. Khare
(74) *Attorney, Agent, or Firm* — Dascenzo Intellectual Property Law, P.C.

(57) ABSTRACT

A method of additively manufacturing an object comprises transforming the resin of a feedstock line from a first at least partially uncured state to a rigid at least partially uncured state, introducing the feedstock line into a delivery guide with the resin of the feedstock line in the rigid at least partially uncured state, transforming the resin of the feedstock line from the rigid at least partially uncured state to a second at least partially uncured state as the feedstock line passes through the delivery guide or as the feedstock line exits the delivery guide, depositing the feedstock line along a print path using the delivery guide, and transforming the resin of the feedstock line from the second at least partially uncured state to an at least partially cured state after the feedstock line is dispensed from the delivery guide along the print path.

21 Claims, 5 Drawing Sheets

(51) Int. Cl.

| | | |
|---|---|---|
| *B29C 70/20* | (2006.01) | |
| *B33Y 10/00* | (2015.01) | |
| *B33Y 30/00* | (2015.01) | |
| *B33Y 50/02* | (2015.01) | |
| *B29C 64/321* | (2017.01) | |
| *B29C 64/141* | (2017.01) | |
| *B29C 64/393* | (2017.01) | |
| *B29C 70/38* | (2006.01) | |
| *B29C 64/118* | (2017.01) | |
| *B29C 64/336* | (2017.01) | |
| *B29C 64/209* | (2017.01) | |
| *B29C 70/24* | (2006.01) | |
| *B29C 64/147* | (2017.01) | |
| *B29C 70/16* | (2006.01) | |
| *B29C 64/295* | (2017.01) | |

(52) U.S. Cl.
CPC .......... *B29C 64/147* (2017.08); *B29C 64/165* (2017.08); *B29C 64/209* (2017.08); *B29C 64/295* (2017.08); *B29C 64/321* (2017.08); *B29C 64/336* (2017.08); *B29C 64/393* (2017.08); *B29C 70/16* (2013.01); *B29C 70/205* (2013.01); *B29C 70/24* (2013.01); *B29C 70/382* (2013.01); *B29C 70/384* (2013.01); *B33Y 10/00* (2014.12); *B33Y 30/00* (2014.12); *B33Y 50/02* (2014.12); *B29C 70/386* (2013.01)

(56) References Cited

U.S. PATENT DOCUMENTS

| | | | |
|---|---|---|---|
| 4,154,634 A | 5/1979 | Shobert et al. | |
| 4,378,343 A | 3/1983 | Sugiura et al. | |
| 4,435,246 A | 3/1984 | Green | |
| 4,943,472 A | 7/1990 | Dyksterhouse et al. | |
| 5,204,124 A | 4/1993 | Secretan et al. | |
| 5,294,461 A | 3/1994 | Ishida | |
| 5,340,433 A | 8/1994 | Crump | |
| 5,398,193 A | 3/1995 | deAngelis | |
| 5,495,328 A | 2/1996 | Spence et al. | |
| 5,936,861 A | 8/1999 | Jang et al. | |
| 6,129,872 A | 10/2000 | Jang | |
| 6,149,856 A | 11/2000 | Zemel et al. | |
| 6,214,279 B1 | 4/2001 | Yang et al. | |
| 6,362,388 B1 | 3/2002 | Lucas | |
| 6,395,210 B1 | 5/2002 | Head et al. | |
| 6,722,872 B1 | 4/2004 | Swanson et al. | |
| 7,114,943 B1 | 10/2006 | Fong et al. | |
| 8,133,537 B2 | 3/2012 | Nair et al. | |
| 8,801,990 B2 | 8/2014 | Mikulak et al. | |
| 8,920,697 B2 | 12/2014 | Mikulak et al. | |
| 9,126,367 B1 * | 9/2015 | Mark | B29C 70/20 |
| 9,149,989 B2 | 10/2015 | Uckelmann | |
| 9,186,848 B2 * | 11/2015 | Mark | B29C 70/20 |
| 9,770,876 B2 * | 9/2017 | Farmer | B29D 99/0078 |
| 9,908,145 B2 * | 3/2018 | Farmer | B05D 3/002 |
| 10,016,942 B2 * | 7/2018 | Mark | B29C 70/20 |
| 10,076,875 B2 * | 9/2018 | Mark | B29C 64/194 |
| 10,099,427 B2 * | 10/2018 | Mark | B29C 70/20 |
| 10,195,784 B2 * | 2/2019 | Evans | B29C 70/382 |
| 10,201,941 B2 * | 2/2019 | Evans | B29C 70/382 |
| 10,232,550 B2 * | 3/2019 | Evans | B29C 70/384 |
| 10,232,570 B2 * | 3/2019 | Evans | B29C 70/382 |
| 10,343,330 B2 * | 7/2019 | Evans | B29C 70/382 |
| 10,343,355 B2 * | 7/2019 | Evans | B29C 69/001 |
| 2003/0044593 A1 | 3/2003 | Vaidyanathan et al. | |
| 2004/0119188 A1 | 6/2004 | Lowe | |
| 2005/0023719 A1 | 2/2005 | Nielsen et al. | |
| 2005/0038222 A1 | 2/2005 | Joshi et al. | |
| 2005/0104241 A1 | 5/2005 | Kritchman et al. | |
| 2005/0116391 A1 | 6/2005 | Lindemann et al. | |
| 2005/0248065 A1 | 11/2005 | Owada | |
| 2007/0029030 A1 | 2/2007 | McCowin | |
| 2008/0213419 A1 | 9/2008 | Skubic et al. | |
| 2008/0315462 A1 | 12/2008 | Batzinger et al. | |
| 2009/0095410 A1 | 4/2009 | Oldani | |
| 2009/0130449 A1 | 5/2009 | El-Siblani | |
| 2009/0314391 A1 | 12/2009 | Crump et al. | |
| 2010/0024964 A1 | 2/2010 | Ingram, Jr. et al. | |
| 2010/0084087 A1 | 4/2010 | McCowin et al. | |
| 2010/0190005 A1 | 7/2010 | Nair et al. | |
| 2011/0147993 A1 | 6/2011 | Eshed et al. | |
| 2011/0300301 A1 | 12/2011 | Fernando et al. | |
| 2014/0061974 A1 | 3/2014 | Tyler | |
| 2014/0086780 A1 | 3/2014 | Miller et al. | |
| 2014/0154347 A1 | 6/2014 | Dilworth et al. | |
| 2014/0263534 A1 | 9/2014 | Post et al. | |
| 2014/0265000 A1 | 9/2014 | Magnotta et al. | |
| 2014/0265040 A1 | 9/2014 | Batchelder | |
| 2014/0291886 A1 | 10/2014 | Mark et al. | |
| 2014/0328964 A1 | 11/2014 | Mark et al. | |
| 2014/0375794 A1 | 12/2014 | Singh | |
| 2015/0008422 A1 | 1/2015 | Lee et al. | |
| 2015/0037599 A1 | 2/2015 | Blackmore | |
| 2015/0044377 A1 | 2/2015 | Tibor et al. | |
| 2015/0048553 A1 | 2/2015 | Dietrich et al. | |
| 2015/0140230 A1 | 5/2015 | Jones et al. | |
| 2015/0158691 A1 | 6/2015 | Mannella et al. | |
| 2015/0165691 A1 | 6/2015 | Mark et al. | |
| 2015/0174824 A1 | 6/2015 | Gifford et al. | |
| 2015/0217517 A1 | 8/2015 | Karpas et al. | |
| 2015/0266243 A1 | 9/2015 | Mark et al. | |
| 2015/0291833 A1 | 10/2015 | Kunc et al. | |
| 2016/0136897 A1 | 5/2016 | Nielsen-Cole et al. | |
| 2016/0159009 A1 | 6/2016 | Canale | |
| 2016/0303793 A1 | 10/2016 | Ermoshkin et al. | |
| 2016/0332363 A1 | 11/2016 | Moore et al. | |
| 2016/0375491 A1 | 12/2016 | Swaminathan et al. | |
| 2017/0014906 A1 | 1/2017 | Ng et al. | |
| 2017/0129180 A1 | 5/2017 | Coates et al. | |
| 2017/0341307 A1 | 11/2017 | Vilajosana et al. | |

FOREIGN PATENT DOCUMENTS

| | | |
|---|---|---|
| DE | 102015002967 | 10/2016 |
| EP | 1151849 | 11/2001 |
| EP | 1494248 | 1/2005 |
| JP | 2015174284 | 10/2015 |
| WO | WO 2006/020685 | 2/2006 |
| WO | WO 2012/039956 | 3/2012 |
| WO | WO 2013/086577 | 6/2013 |
| WO | WO 2014/153535 | 9/2014 |
| WO | WO 2015/009938 | 1/2015 |
| WO | WO2015193819 | 12/2015 |
| WO | WO 2016/053681 | 4/2016 |
| WO | WO 2016125138 | 8/2016 |
| WO | WO 2016139059 | 9/2016 |
| WO | WO2016149181 | 9/2016 |

OTHER PUBLICATIONS

Machine generated English translation of abstract for DE 201310103973 downloaded from Espacenet.com on Nov. 1, 2017.
Machine generated English translation of the abstract of JP2015174284, downloaded from Espacenet.com Jun. 12, 2018.
Machine generated English translation of the abstract of DE102015002967, downloaded from Espacenet.com Jun. 12, 2018.
Machine generated English translation of the abstract of EP 1494248, downloaded from Espacenet.com on Nov. 21, 2018.
U.S. Appl. No. 15/610,466, filed May 31, 2017, Wilenski et al.
U.S. Appl. No. 15/367,021, filed Dec. 1, 2016, Wilenski et al.
U.S. Appl. No. 15/356,420, filed Nov. 18, 2016, Wilenski et al.
U.S. Appl. No. 15/346,537, filed Nov. 8, 2016, Wilenski et al.
U.S. Appl. No. 15/345,189, filed Nov. 7, 2016, Wilenski, et al.
U.S. Appl. No. 15/063,400, filed Mar. 7, 2016, Evans et al.
Website screenshots showing Stratonics ThermaViz® Sensor Systems, from Stratonics.com website, downloaded on Nov. 4, 2016.
Printout of online article, "Improving Additive Manufacturing (3D (56) References Cited

OTHER PUBLICATIONS

Printing) using Infrared Imaging," Aug. 10, 2016, from AZoM.com website, downloaded on Nov. 4, 2016.
U.S. Appl. No. 14/995,507, filed Jan. 14, 2016, Evans et al.
U.S. Appl. No. 14/931,573, filed Nov. 3, 2015, Evans et al.
U.S. Appl. No. 14/920,748, filed Oct. 22, 2015, Evans et al.
U.S. Appl. No. 14/841,470, filed Aug. 31, 2015, Evans et al.
U.S. Appl. No. 14/841,423, filed Aug. 31, 2015, Evans et al.
Website screenshots of online article, Evan Milberg, "Arevo Labs Introduces First Robot-Based Platform for 3-D Printing Composite Parts," Nov. 23, 2015, from CompositesManufacturingMagazine.com website, downloaded on Jan. 12, 2016.
Printout of online article, Jeff Sloan, "Arevo Labs launches 3D printing platform for composite parts fabrication," Nov. 16, 2015, from CompositesWorld.com website, downloaded on Dec. 9, 2015.
Website screenshots of online how-to article, "Fiber Composite 3D Printing (The Bug)," from Instructables.com website, downloaded on Aug. 20, 2015.
Printout of website showing FormLabs, Frequently Asked Questions (re the Form1+ SLA 3D Printer), from FormLabs.com website, downloaded on Aug. 19, 2015.
Website screenshots showing the Form 1+ SLA 3D Printer, from FormLabs.com website, downloaded on Aug. 20, 2015.
Printout of online article "Carbon3D Introduces Breakthrough CLIP Technology for Layerless 3D Printing, 25-100x Faster," Mar. 17, 2015, from 3Ders.org website, downloaded on Aug. 19, 2015.
Website screenshots showing online article, Krassenstein "Orbital Composites to Make 3D Printing 100 Times Faster Using Carbon Fiber, Fiber Optics, Injection & More," Apr. 28, 2015, from 3DPrint.com website, downloaded on Aug. 19, 2015.
Printout of online article "Carbon-Fiber Epoxy Honeycombs Mimic the Material Performance of Balsa Wood," Jun. 27, 2014, downloaded from redorbit.com/news/science/1113180114/carbon-fiber-epoxy-honeycombs-mimic-the-material-performance-of-balsa-wood/, Aug. 19, 2015.
Website screenshots showing the Mark One Composite 3D Printer, from MarkForged.com website, downloaded on Aug. 19, 2015.
Website screenshots showing abstract of Debout et al., "Tool Path Smoothing of a Redundant Machine: Application to Automated Fiber Placement," Computer-Aided Design, vol. 43, Issue 2, pp. 122-132, Feb. 2011, from ScienceDirect.com website, downloaded on Aug. 19, 2015.
Printout of online article "Automated Fiber Placement," from AutomatedDynamics.com website, downloaded on Aug. 19, 2015.
User Manual for 3Doodler 2.0, from The3Doodler.com website, downloaded on Aug. 19, 2015.
Website screenshots showing "Fiber Composite 3D Printing," from MakeZine.com website, downloaded on Jun. 2, 2015.
Farshidianfar et al., "Real-Time Control of Microstructure in Laser Assitive Manufacturing," International Journal of Advanced Manufacturing Technology (2016), vol. 82, pp. 1173-1186, published online Jul. 1, 2015.
Hu et al., "Sensing, Modeling and Control for Laser-Based Additive Manufacturing," International Journal of Machine Tools and Manufacture, No. 43, pp. 51-60, 2003.
Gupta et al., "Dual Curing of Carbon Fiber Reinforced Photoresins for Rapid Prototyping," Polymer Composites, vol. 23, No. 6, pp. 1162-1170, Dec. 2002.
Renault et al., "Photo Dynamic Mechanical Analysis for Cure Monitoring of Fiber Reinforced Photoresin Composites," Journal of Advanced Materials, vol. 29, No. 1, pp. 42-47, Oct. 12, 1996.
Ogale et al., "3-Dimensional Composite Photolithography," Proceedings of the American Society for Composites, Eleventh Technical Conference, pp. 822-828, Oct. 7-9, 1996.
Ogale et al., "Fabrication of Fiber Reinforced Plates with Curvilinear Layout by 3-D Photolithography," $26^{th}$ International SAMPE Technical Conference, vol. 26, pp. 54-61, Oct. 17-20, 1994.

\* cited by examiner

METHODS FOR ADDITIVE MANUFACTURING

FIELD

The present disclosure relates to additive manufacturing.

BACKGROUND

An additive manufacturing process may include dispensing or extruding a feedstock material from a print head, or nozzle, that is capable of moving in three dimensions under computer control to manufacture a part. Depending on the properties of the feedstock material, its advancement through the print head may be difficult or result in undesirable effects. For example, when the feedstock material is or includes a glutinous material, the feedstock material may gum-up, clog, or otherwise foul the print head. As another example, when the feedstock material includes elongate carbon or other fibers, the fibers may kink, break, or otherwise buckle and become damaged or clog the print head. As yet another example, when the feedstock material is or includes an uncured or partially cured, curable resin, the resin may undesirably gradually cure inside the print head to progressively clog the print head and partially or completely obstruct the operative advancement of the feedstock material through the print head.

SUMMARY

Accordingly, apparatuses and methods, intended to address at least the above-identified concerns, would find utility.

The following is a non-exhaustive list of examples, which may or may not be claimed, of the subject matter according to the invention.

One example of the subject matter according to the invention relates to a system for additively manufacturing an object. The system comprises a source of a feedstock line, a rigidizing mechanism, a delivery guide, a feed mechanism, a de-rigidizing mechanism, and a curing mechanism. The feedstock line, originating from the source, comprises elongate fibers, at least partially encapsulated in a resin in a first at least partially uncured state. The rigidizing mechanism is to receive the feedstock line from the source with the resin of the feedstock line in the first at least partially uncured state. The rigidizing mechanism is configured to transform the resin of the feedstock line from the first at least partially uncured state to a rigid at least partially uncured state. The feedstock line and the resin are more rigid when the resin is in the rigid at least partially uncured state than when the resin is in the first at least partially uncured state. The delivery guide is to receive the feedstock line from the rigidizing mechanism with the resin in the rigid at least partially uncured state. The delivery guide is configured to deposit the feedstock line along a print path. The feed mechanism is configured to feed the feedstock line through the delivery guide. The de-rigidizing mechanism is configured to transform the resin of the feedstock line, as the feedstock line passes through the delivery guide or as the feedstock line exits the delivery guide, from the rigid at least partially uncured state to a second at least partially uncured state, so that, before the feedstock line is deposited along the print path by the delivery guide, the resin of the feedstock line, exiting the delivery guide, is in the second at least partially uncured state. The feedstock line and the resin are less rigid when the resin is in the second at least partially uncured state than when the resin is in the rigid at least partially uncured state. The curing mechanism is configured to transform the resin of the feedstock line, deposited by the delivery guide along the print path, from the second at least partially uncured state to an at least partially cured state.

The system therefore may be used to manufacture the object from the feedstock line. Moreover, the system may be used to manufacture the object with the elongate fibers being oriented in desired and/or predetermined orientations throughout the object, such as to define desired properties of the object. Because the elongate fibers are encapsulated in the resin when the feedstock line is in the source, the feedstock line originating from the source may be described as a prepreg feedstock line. In addition, because the feedstock line may have a significant length, the feedstock line in the source may need to be coiled, or spooled, for the source to be compact or otherwise manageable in size. Accordingly, the feedstock line originating from the source may need to be sufficiently flexible, or bendable, to be coiled without damage to the elongate fibers, yet sufficiently rigid so that the resin does not flow and so that the feedstock line maintains its integrity as a continuous flexible line. However, the first at least partially uncured state of the feedstock line may be too flexible to be operably fed into and advanced through the delivery guide and may be too tacky, or sticky, to be operably handled by the system without gumming up, or otherwise soiling, component parts of the system. Accordingly, the rigidizing mechanism transforms the feedstock line from the first at least partially uncured state to the rigid at least partially uncured state so that the feed mechanism can advance the feedstock line into the delivery guide without soiling or damaging the feed mechanism, and without the elongate fibers buckling, breaking, or otherwise becoming damaged. Moreover, because the feedstock line is then in the rigid at least partially uncured state, it will easily be advanced through the delivery guide for ultimate depositing along the print path to manufacture the object. However, the feedstock line in its rigid at least partially uncured state is too rigid for deposition along the print path in three-dimensions. Accordingly, the de-rigidizing mechanism is provided to transform the feedstock line from the rigid at least partially uncured state to a sufficiently non-rigid uncured state—the second at least partially uncured state— for ultimate deposition along the print path. The de-rigidizing mechanism may de-rigidize the feedstock line either as it is passing through the delivery guide or as the feedstock line exits the delivery guide, depending on the configuration of the de-rigidizing mechanism and depending on the properties of the feedstock line in the second at least partially uncured state. Finally, the curing mechanism transforms the resin from the second at least partially uncured state to the at least partially cured state, to at least partially cure the object while it is being manufactured, or in situ.

Another example of the subject matter according to the invention relates to a method of additively manufacturing an object from a feedstock line, in which the feedstock line comprises elongate fibers at least partially encapsulated in a resin. The method comprises transforming the resin of the feedstock line from a first at least partially uncured state to a rigid at least partially uncured state. The feedstock line and the resin are more rigid when the resin is in the rigid at least partially uncured state than when the resin is in the first at least partially uncured state. The method further comprises introducing the feedstock line into a delivery guide with the resin of the feedstock line in the rigid at least partially uncured state. The method additionally comprises transforming the resin of the feedstock line from the rigid at least partially uncured state to a second at least partially uncured state as the feedstock line passes through the delivery guide or as the feedstock line exits the delivery guide. The feedstock line and the resin are less rigid when the resin is in the second at least partially uncured state than when the resin is in the rigid at least partially uncured state. The method further comprises depositing the feedstock line along a print path, with the resin in the second at least partially uncured state, using the delivery guide. The method also comprises transforming the resin of the feedstock line from the second at least partially uncured state to an at least partially cured state after the feedstock line is dispensed from the delivery guide along the print path. The resin in the at least partially cured state is cured more than the resin in the second at least partially uncured state.

The method therefore may be implemented to manufacture the object from the feedstock line. Moreover, the method may be implemented to manufacture the object with the elongate fibers being oriented in desired and/or predetermined orientations throughout the object, such as to define desired properties of the object. Because the elongate fibers are encapsulated in the resin, the feedstock line 106 may be described as a prepreg feedstock line. In addition, because the feedstock line may have a significant length, the feedstock line may be coiled, or spooled, prior to being introduced into the delivery guide. Accordingly, the feedstock line may need to be sufficiently flexible, or bendable, to be coiled without damage to the elongate fibers, yet sufficiently rigid so that the resin does not flow and so that the feedstock line maintains its integrity as a continuous flexible line. However, the first at least partially uncured state of the feedstock line may be too flexible to be operably fed into and advanced through the delivery guide and may be too tacky, or sticky, to be operably handled by an associated system without gumming up, or otherwise soiling, component parts of the system. Accordingly, transforming the feedstock line from the first at least partially uncured state to the rigid at least partially uncured state facilitates the introduction of the feedstock line into and the passage of the feedstock line through the delivery guide, without the elongate fibers buckling, breaking, or otherwise becoming damaged, and without the resin soiling an associated system. Subsequently transforming the feedstock line from the rigid at least partially uncured state to the second at least partially uncured state as the feedstock line passes through the delivery guide or as the feedstock line exits the delivery guide results in the feedstock line being sufficiently flexible to be operatively deposited in three dimensions by the delivery guide to additively manufacture the object. Depending on the properties of the feedstock line, in some implementations of the method, it may be beneficial to transform the feedstock line to the second non-rigid cured state as it passes through the delivery guide. In other implementations of the method, it may be beneficial to transform the feedstock line to the second non-rigid uncured state as it exits the delivery guide. Finally, at least partially curing the resin from the second at least partially uncured state to the at least partially cured state, enables curing of the object as it is being manufactured, or in situ.

BRIEF DESCRIPTION OF THE DRAWINGS

Having thus described one or more examples of the invention in general terms, reference will now be made to the accompanying drawings, which are not necessarily drawn to scale, and wherein like reference characters designate the same or similar parts throughout the several views, and wherein:

DESCRIPTION

Figure 1:
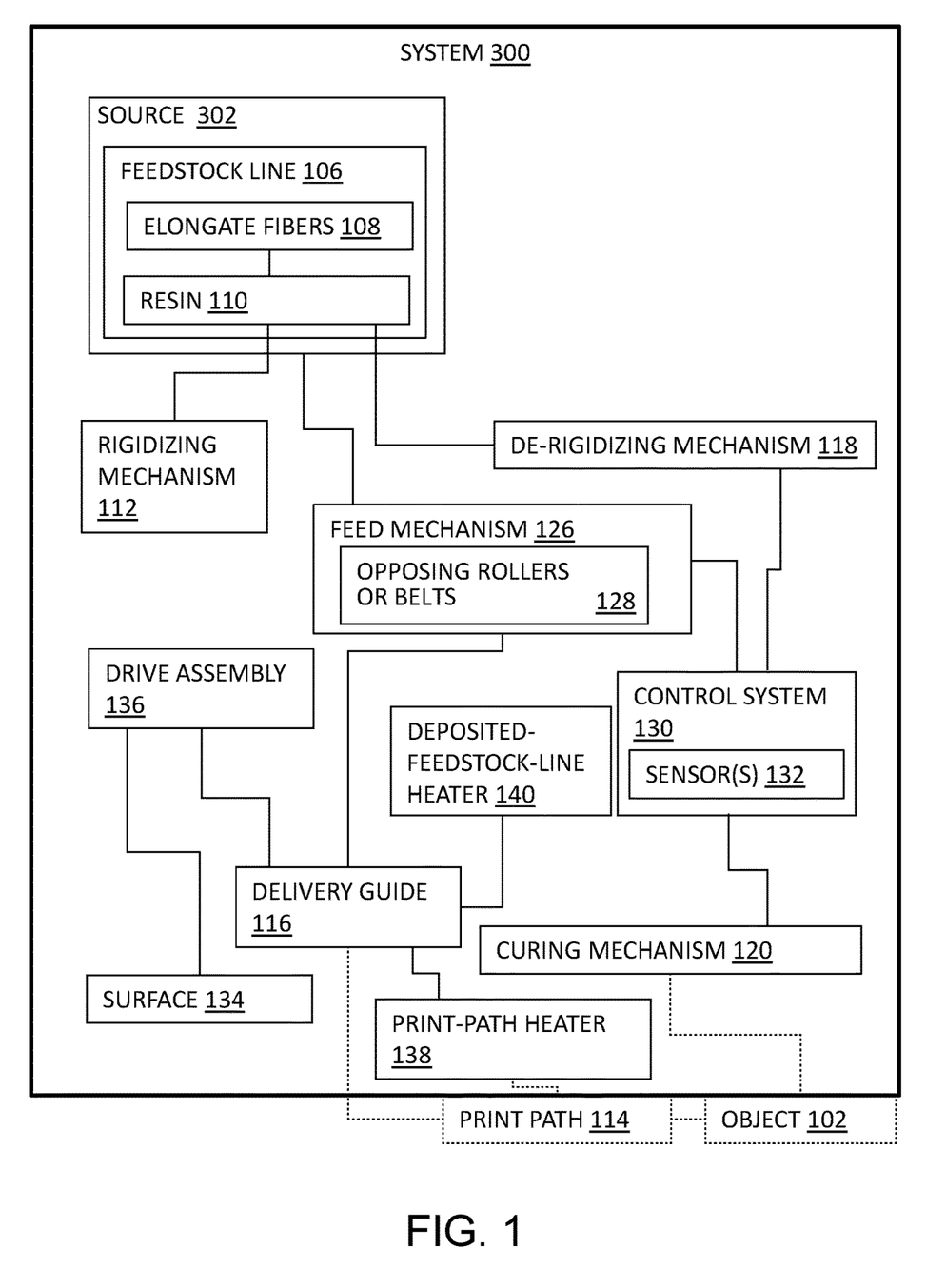
FIG. 1 is a block diagram of a system for additively manufacturing an object, according to one or more examples of the present disclosure.

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

Figure 3:
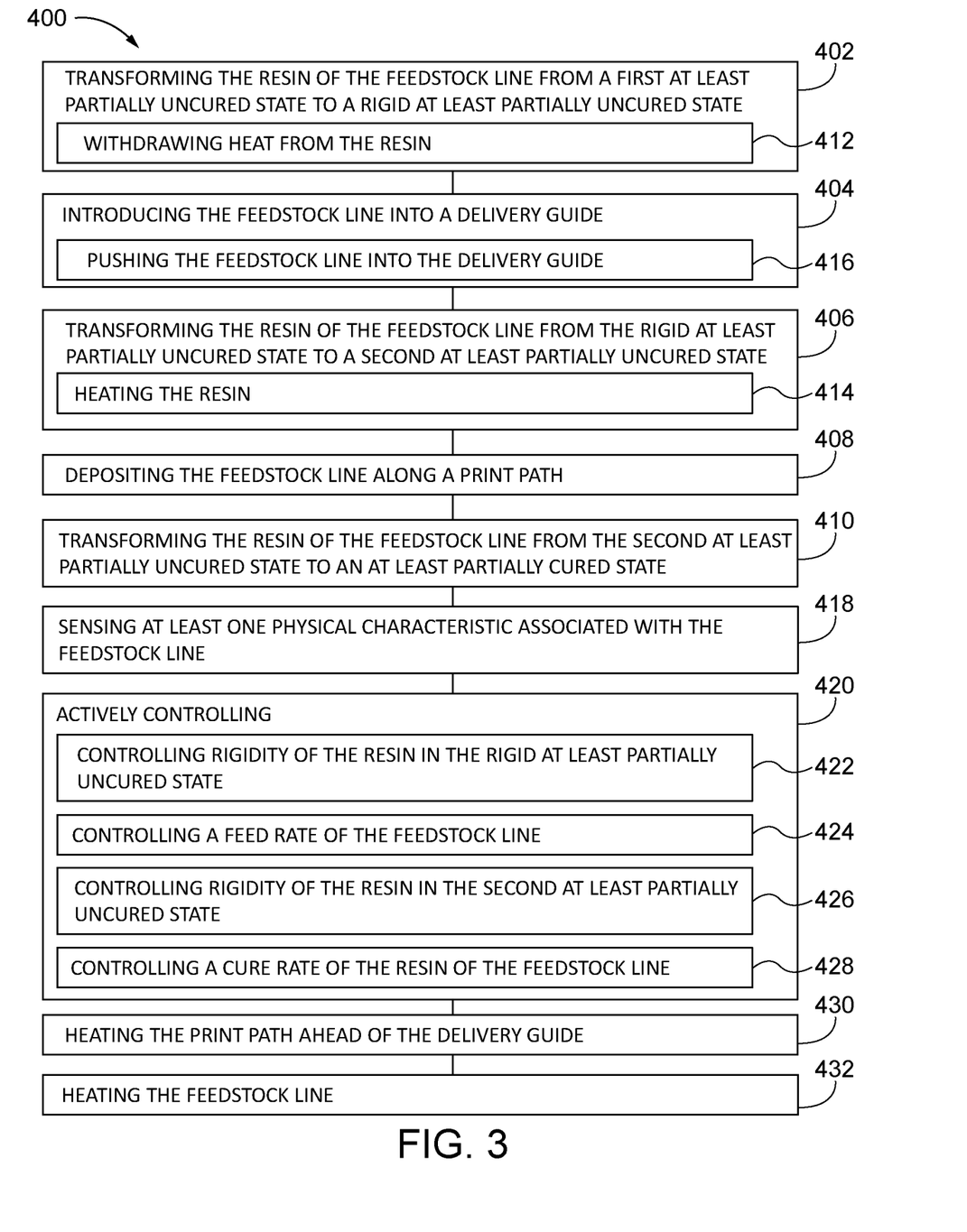
FIG. 3 is a flow diagram of a method of additively manufacturing an object, according to one or more examples of the present disclosure.
Figure 4:
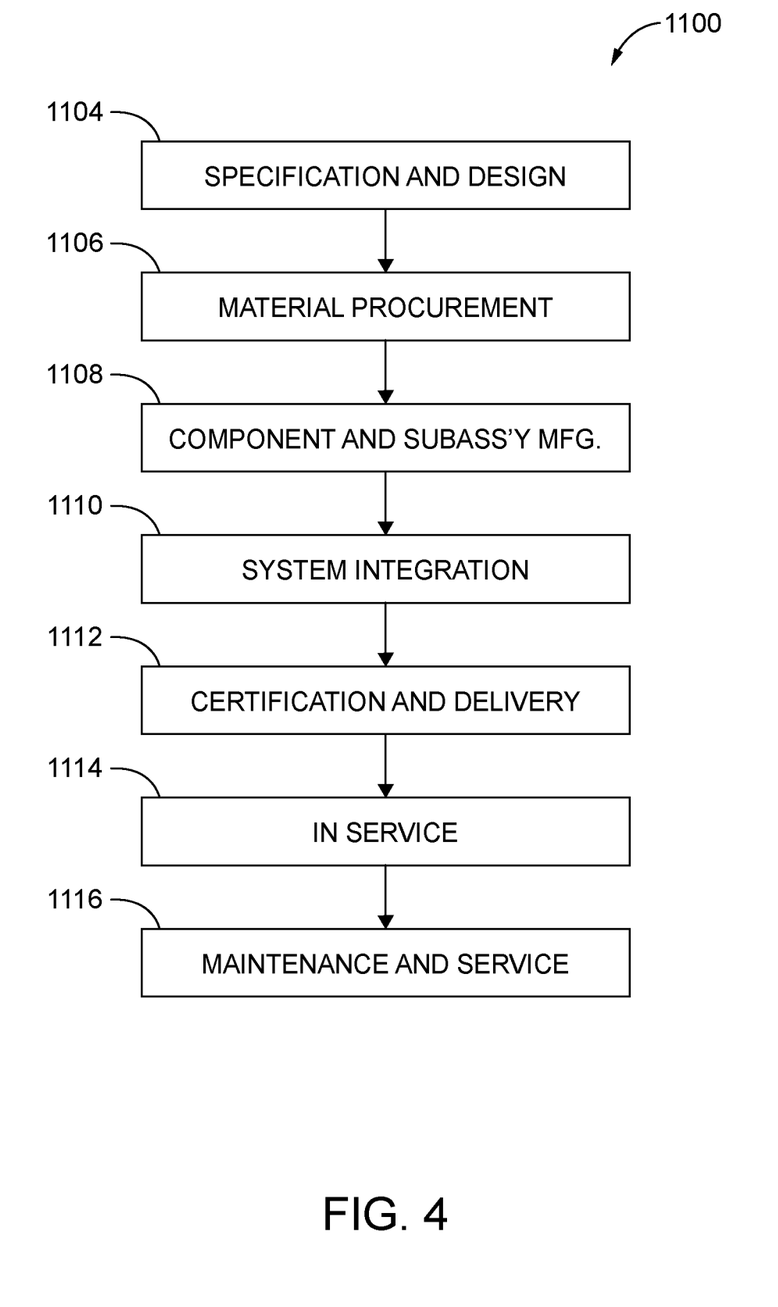
FIG. 4 is a flow diagram of aircraft production and service methodology.

In FIGS. 3 and 4, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 3 and 4 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Figure 2:
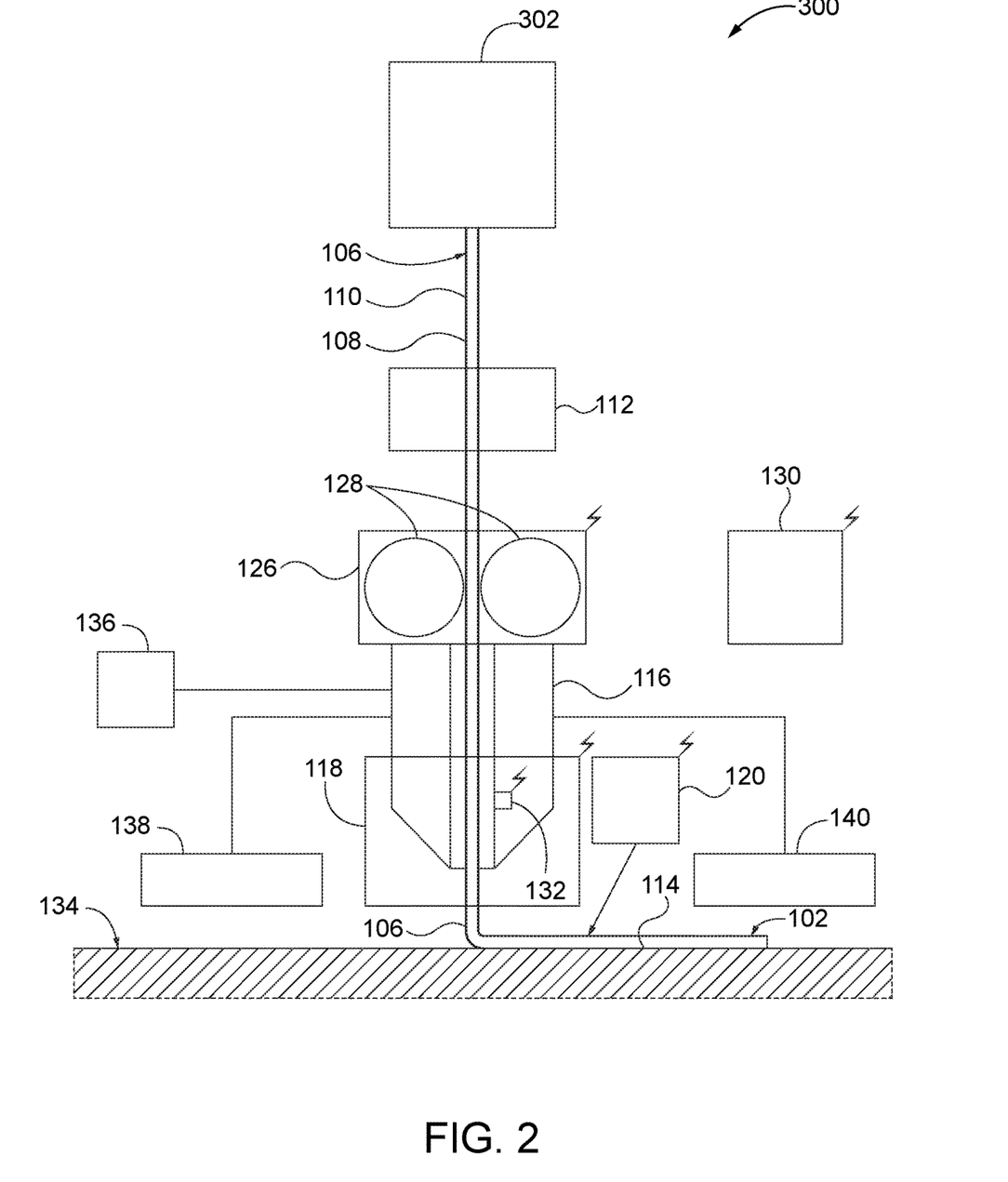
FIG. 2 is a schematic representation of the system of FIG. 1, according to one or more examples of the present disclosure.

Referring generally to FIG. 1 and particularly to FIG. 2, system 300 for additively manufacturing object 102 is disclosed. System 300 comprises source 302 of feedstock line 106, rigidizing mechanism 112, delivery guide 116, feed mechanism 126, de-rigidizing mechanism 118, and curing mechanism 120. Feedstock line 106, originating from source 302, comprises elongate fibers 108, at least partially encapsulated in resin 110 in a first at least partially uncured state. Rigidizing mechanism 112 is to receive feedstock line 106 from source 302 with resin 110 of feedstock line 106 in the first at least partially uncured state. Rigidizing mechanism 112 is configured to transform resin 110 of feedstock line 106 from the first at least partially uncured state to a rigid at least partially uncured state. Feedstock line 106 and resin 110 are more rigid when resin 110 is in the rigid at least partially uncured state than when resin 110 is in the first at least partially uncured state. Delivery guide 116 is to receive feedstock line 106 from rigidizing mechanism 112 with resin 110 in the rigid at least partially uncured state.

Delivery guide 116 is configured to deposit feedstock line 106 along print path 114. Feed mechanism 126 is configured to feed feedstock line 106 through delivery guide 116. De-rigidizing mechanism 118 is configured to transform resin 110 of feedstock line 106, as feedstock line 106 passes through delivery guide 116 or as feedstock line 106 exits delivery guide 116, from the rigid at least partially uncured state to a second at least partially uncured state, so that, before feedstock line 106 is deposited along print path 114 by delivery guide 116, resin 110 of feedstock line 106, exiting delivery guide 116, is in the second at least partially uncured state. Feedstock line 106 and resin 110 are less rigid when resin 110 is in the second at least partially uncured state than when resin 110 is in the rigid at least partially uncured state. Curing mechanism 120 is configured to transform resin 110 of feedstock line 106, deposited by delivery guide 116 along print path 114, from the second at least partially uncured state to an at least partially cured state. The preceding subject matter of this paragraph characterizes example 1 of the present disclosure.

System 300 therefore may be used to manufacture object 102 from feedstock line 106. Moreover, system 300 may be used to manufacture object 102 with elongate fibers 108 being oriented in desired and/or predetermined orientations throughout object 102, such as to define desired properties of object 102. Because elongate fibers 108 are encapsulated in resin 110 when feedstock line 106 is in source 302, feedstock line 106 originating from source 302 may be described as a prepreg feedstock line. In addition, because feedstock line 106 may have a significant length, feedstock line 106 in source 302 may need to be coiled, or spooled, for source 302 to be compact or otherwise manageable in size. Accordingly, feedstock line 106 originating from source 302 may need to be sufficiently flexible, or bendable, to be coiled without damage to elongate fibers 108, yet sufficiently rigid so that resin 110 does not flow and so that feedstock line 106 maintains its integrity as a continuous flexible line. However, the first at least partially uncured state of feedstock line 106 may be too flexible to be operably fed into and advanced through delivery guide 116 and may be too tacky, or sticky, to be operably handled by system 300 without gumming up, or otherwise soiling, component parts of system 300. Accordingly, rigidizing mechanism 112 transforms feedstock line 106 from the first at least partially uncured state to the rigid at least partially uncured state so that feed mechanism 126 can advance feedstock line 106 into delivery guide 116 without soiling or damaging feed mechanism 126, and without elongate fibers 108 buckling, breaking, or otherwise becoming damaged. Moreover, because feedstock line 106 is then in the rigid at least partially uncured state, it will easily be advanced through delivery guide 116 for ultimate depositing along print path 114 to manufacture object 102. However, feedstock line 106 in its rigid at least partially uncured state is too rigid for deposition along print path 114 in three-dimensions. Accordingly, de-rigidizing mechanism 118 is provided to transform feedstock line 106 from the rigid at least partially uncured state to a sufficiently non-rigid uncured state—the second at least partially uncured state—for ultimate deposition along print path 114. Moreover, de-rigidizing mechanism 118 ensures appropriate wetting, or adhesion, between two adjacent layers of feedstock line 106, when a length of feedstock line 106 is being deposited against a prior-deposited length of feedstock line 106. De-rigidizing mechanism 118 may de-rigidize feedstock line 106 either as it is passing through delivery guide 116 or as feedstock line 106 exits delivery guide 116, depending on the configuration of de-rigidizing mechanism 118 and depending on the properties of feedstock line 106 in the second at least partially uncured state. Finally, curing mechanism 120 transforms resin 110 from the second at least partially uncured state, to the at least partially cured state, to at least partially cure object 102 while it is being manufactured, or in situ.

Some examples of system 300 additionally or alternatively may be described as 3-D printers.

Elongate fibers 108 may take any suitable form and be constructed of any suitable material depending on desired properties of object 102 to be manufactured by system 300. In one example, elongate fibers 108 include, but are not limited to, carbon fibers, glass fibers, synthetic organic fibers, aramid fibers, natural fibers, wood fibers, boron fibers, silicon-carbide fibers, optical fibers, fiber bundles, fiber tows, fiber weaves, fiber braids, wires, metal wires, conductive wires, and wire bundles. Feedstock line 106 may be created from a single configuration, or type, of elongate fibers 108 or may be created from more than one configuration, or type, of elongate fibers 108. By "elongate," it is meant that elongate fibers 108 are generally continuous in nature along feedstock line 106 as it is being created, as opposed to, for example, use of chopped-fiber segments. That said, elongate fibers 108 may comprise discontinuous segments of fibers that are bundled, woven, braided, or otherwise combined, and still be considered generally continuous in nature along feedstock line 106. Elongate fibers 108 have a length that is significantly longer than a dimension (e.g., diameter or width) that is transverse, or perpendicular, to its length. As an illustrative, non-exclusive example, elongate fibers 108 may have a length that is at least 100, at least 1000, at least 10000, at least 100000, or at least 1000000 times greater than their diameter or width.

Resin 110 may take any suitable form depending on desired properties of object 102 and depending on the functionality of system 300 and curing mechanism 120. In some examples, resin 110 may comprise a photopolymer resin that is configured to be cured by selective application of light. In other examples, resin 110 may comprise a thermoset resin that is configured to be cured by selective application of heat or radiation. Other types of resin 110 also may be used and incorporated into system 300.

Referring generally to FIG. 1 and particularly to FIG. 2, feedstock line 106 in the first at least partially uncured state has a shear modulus greater than 0.08 GPa and less than or equal to 0.1 GPa. Feedstock line 106 in the rigid at least partially uncured state has a shear modulus greater than 0.1 GPa. Feedstock line 106 in the second at least partially uncured state has a shear modulus less than or equal to 0.1 GPa. The preceding subject matter of this paragraph characterizes example 2 of the present disclosure, wherein example 2 also includes the subject matter according to example 1, above.

With 0.1 GPa as a threshold shear modulus, or rigidity, feedstock line 106, when rigidized by rigidizing mechanism 112, is sufficiently rigid to be advanced by feed mechanism 126 into and through delivery guide 116. Moreover, by de-rigidizing feedstock line 106 below a shear modulus of 0.1 GPa, feedstock line 106 may be deposited along a circuitous print path, e.g., print path 114 with curves in two or three dimensions. However, other threshold values of shear modulus may be utilized, such as based on the stiffness of elongate fibers 108, the number of elongate fibers 108 in a corresponding tow, a shape of feedstock line 106, a diameter of feedstock line 106, properties of resin 110, etc.

Referring generally to FIG. 1 and particularly to FIG. 2, rigidizing mechanism 112 is configured to withdraw heat from resin 110 of feedstock line 106 in the first at least partially uncured state to transform resin 110 of feedstock line 106 from the first at least partially uncured state to the rigid at least partially uncured state. De-rigidizing mechanism 118 is configured to heat resin 110 of feedstock line 106 in the rigid at least partially uncured state to transform resin 110 of feedstock line 106 from the rigid at least partially uncured state to the second at least partially uncured state. The preceding subject matter of this paragraph characterizes example 3 of the present disclosure, wherein example 3 also includes the subject matter according to example 1 or 2, above.

When rigidizing mechanism 112 withdraws heat from resin 110 of feedstock line 106 to transform it to the rigid at least partially uncured state, rigidizing mechanism 112 cools resin 110 to a sufficient degree that its shear modulus, or rigidity, is sufficiently high for feed mechanism 126 to operatively advance feedstock line 106 into and through delivery guide 116 without undesirably soiling, gumming up, or damaging feed mechanism 126 and delivery guide 116. In some examples, rigidizing mechanism 112 may be described as freezing resin 110 and/or feedstock line 106. Then, to reverse the rigidity of resin 110 and feedstock line 106, de-rigidizing mechanism 118 heats resin 110 to transform it to the second at least partially uncured state for operative deposition by delivery guide 116 along print path 114.

Rigidizing mechanism 112 and de-rigidizing mechanism 118 may take any suitable configuration and utilize any suitable mechanism for withdrawing heat and applying heat, respectively. For example, rigidizing mechanism 112 may utilize a refrigeration cycle to withdraw heat from resin 110. Additionally or alternatively, rigidizing mechanism 112 may utilize a cold fluid that is passed over and contacts feedstock line 106 to withdraw heat from resin 110. In some examples, de-rigidizing mechanism 118 may be or include a resistive heater, an inductive heater, or a radiative heater, such as operatively coupled to or positioned within delivery guide 116, such as at or adjacent to where feedstock line 106 exits delivery guide 116. Additionally or alternatively, de-rigidizing mechanism 118 may include or utilize a laser or a heated fluid stream to heat resin 110. In some examples, curing mechanism 120 may additionally serve as de-rigidizing mechanism 118. Other examples of rigidizing mechanism 112 and de-rigidizing mechanism 118 also are within the scope of the present disclosure and may be incorporated into system 300.

Referring generally to FIG. 1 and particularly to FIG. 2, feed mechanism 126 is configured to push feedstock line 106 through delivery guide 116. The preceding subject matter of this paragraph characterizes example 4 of the present disclosure, wherein example 4 also includes the subject matter according to any one of examples 1 to 3, above.

Feed mechanism 126 facilitates the advancement of feedstock line 106 into, through, and out of delivery guide 116. By being positioned to push feedstock line 106 though delivery guide 116, it is upstream of the exit of delivery guide 116 and thus is positioned out of the way of the movement of delivery guide 116 and deposition of feedstock line 106 along print path 114.

Referring generally to FIG. 1 and particularly to FIG. 2, feed mechanism 126 comprises opposing rollers or belts 128, configured to engage opposite sides of feedstock line 106 and to selectively rotate to push feedstock line 106 through delivery guide 116. The preceding subject matter of this paragraph characterizes example 5 of the present disclosure, wherein example 5 also includes the subject matter according to example 4, above.

Opposing rollers or belts 128, when selectively rotated, act to frictionally engage feedstock line 106, thereby feeding it between opposing rollers or belts 128 and pushing it into and through delivery guide 116. Feed mechanism 126 additionally or alternatively may comprise other pinch mechanisms configured to push feedstock line 106 through delivery guide 116.

Referring generally to FIG. 1 and particularly to FIG. 2, system 300 further comprises control system 130 that comprises at least one sensor 132, configured to sense at least one physical characteristic associated with feedstock line 106. Control system 130 is configured to actively control at least one of rigidizing mechanism 112, feed mechanism 126, de-rigidizing mechanism 118, or curing mechanism 120, based at least in part on at least the one physical characteristic associated with feedstock line 106. The preceding subject matter of this paragraph characterizes example 6 of the present disclosure, wherein example 6 also includes the subject matter according to any one of examples 1 to 5, above.

By sensing at least one physical characteristic associated with feedstock line 106 and actively controlling rigidizing mechanism 112, feed mechanism 126, de-rigidizing mechanism 118, and/or curing mechanism 120 based on at least one physical characteristic associated with feedstock line 106, system 300 may in real time control the rigidity of feedstock line 106, the feed rate of feedstock line 106, and the cure rate of feedstock line 106.

Illustrative, non-exclusive examples of physical characteristics associated with feedstock line 106 that may be sensed by at least one sensor 132 include rigidity, stiffness, flexibility, hardness, viscosity, temperature, degree of cure, size, volume fractions, and shape.

In FIG. 2, communication between control system 130 and various components of system 100 is schematically represented by lightning bolts. Such communication may be wired and/or wireless in nature.

Referring generally to FIG. 1 and particularly to FIG. 2, control system 130 is configured to actively control rigidizing mechanism 112, based at least in part on at least the one physical characteristic, associated with feedstock line 106, to control rigidity of resin 110 in the rigid at least partially uncured state. The preceding subject matter of this paragraph characterizes example 7 of the present disclosure, wherein example 7 also includes the subject matter according to example 6, above.

By actively controlling rigidizing mechanism 112 based on at least one physical characteristic of feedstock line 106, the rigidity of feedstock line 106 in the rigid at least partially uncured state may be controlled to ensure that feedstock line 106 is sufficiently rigid to be operatively advanced by feed mechanism 126 into and through delivery guide 116.

Referring generally to FIG. 1 and particularly to FIG. 2, control system 130 is configured to actively control feed mechanism 126, based at least in part on at least the one physical characteristic associated with feedstock line 106, to control a feed rate of feedstock line 106. The preceding subject matter of this paragraph characterizes example 8 of the present disclosure, wherein example 8 also includes the subject matter according to example 6 or 7, above.

By actively controlling feed mechanism 126 based at least on one physical characteristic of feedstock line 106, the feed rate of feedstock line 106 may be controlled, such as to ensure that rigidizing mechanism 112 has ample time to suitably rigidize feedstock line 106 and/or so that de-rigidizing mechanism 118 has ample time to suitably de-rigidize feedstock line 106.

Referring generally to FIG. 1 and particularly to FIG. 2, control system 130 is configured to actively control de-rigidizing mechanism 118, based at least in part on at least the one physical characteristic, associated with feedstock line 106, to control rigidity of resin 110 in the second at least partially uncured state. The preceding subject matter of this paragraph characterizes example 9 of the present disclosure, wherein example 9 also includes the subject matter according to any one of examples 6 to 8, above.

By actively controlling de-rigidizing mechanism 118 based at least on one physical characteristic of feedstock line 106, the second at least partially uncured state of feedstock line 106 may be controlled to ensure a sufficient flexibility of feedstock line 106 for operative deposition by delivery guide 116 along print path 114. In addition, actively controlling de-rigidizing mechanism 118 ensures wetting, or adhesion, between two adjacent layers of feedstock line 106, when a length of feedstock line 106 is being deposited against a prior-deposited length of feedstock line 106.

Referring generally to FIG. 1 and particularly to FIG. 2, control system 130 is configured to actively control curing mechanism 120, based at least in part on at least the one physical characteristic, associated with feedstock line 106, to control a cure rate of resin 110 of feedstock line 106. The preceding subject matter of this paragraph characterizes example 10 of the present disclosure, wherein example 10 also includes the subject matter according to any one of examples 6 to 9, above.

By actively controlling curing mechanism 120 based at least on one physical characteristic of feedstock line 106, the intensity or power of curing energy may be controlled to ensure that a desired degree of cure or cure rate is imparted to feedstock line 106 as object 102 is being manufactured by system 300.

Referring generally to FIG. 1 and particularly to FIG. 2, system 300 further comprises surface 134 and drive assembly 136. Print path 114 is stationary relative to surface 134. Drive assembly 136 is configured to operatively and selectively move at least one of delivery guide 116 or surface 134 relative to each other to additively manufacture object 102. The preceding subject matter of this paragraph characterizes example 11 of the present disclosure, wherein example 11 also includes the subject matter according to any one of examples 1 to 10, above.

Drive assembly 136 facilitates the relative movement between delivery guide 116 and surface 134 so that object 102 is manufactured from feedstock line 106 as it is deposited via delivery guide 116.

Drive assembly 136 may take any suitable form, such that delivery guide 116 and surface 134 may be operatively moved relative to each other in three dimensions for additive manufacturing of object 102. In some examples, drive assembly 136 may be a robotic arm, and delivery guide 116 may be described as an end effector of the robotic arm. Drive assembly 136 may provide for relative movement between delivery guide 116 and surface 134 in any multiple degrees of freedom, including, for example, orthogonally in three dimensions relative to another, in three dimensions with at least three degrees of freedom relative to another, in three dimensions with at least six degrees of freedom relative to another, in three dimensions with at least nine degrees of freedom relative to another, and/or in three dimensions with at least twelve degrees of freedom relative to another.

Referring generally to FIG. 1 and particularly to FIG. 2, system 300 further comprises print-path heater 138, configured to heat print path 114 ahead of delivery guide 116 as delivery guide 116 deposits feedstock line 106 along print path 114. The preceding subject matter of this paragraph characterizes example 12 of the present disclosure, wherein example 12 also includes the subject matter according to any one of examples 1 to 11, above.

By heating print path 114 ahead of delivery guide 116 as delivery guide 116 deposits feedstock line 106 along print path 114, print-path heater 138 prepares the surface against which feedstock line 106 is deposited. For example, when feedstock line 106 is being deposited against a prior length of feedstock line 106 that has already been cured, or at least partially cured, by curing mechanism 120, heating of the prior length of feedstock line 106 facilitates wetting and adhesion between the two layers of feedstock line 106.

In some examples, print-path heater 138 may utilize induction heating and/or resistive heating, for example, with print-path heater 138 inductively and/or electrically coupled with elongate fibers 108 within feedstock line 106. Additionally or alternatively, print-path heater 138 may comprise a radiative heater and/or a laser to heat print path 114.

Referring generally to FIG. 1 and particularly to FIG. 2, system 300 further comprises deposited-feedstock-line heater 140, configured to heat feedstock line 106 after feedstock line 106 is deposited by delivery guide 116. The preceding subject matter of this paragraph characterizes example 13 of the present disclosure, wherein example 13 also includes the subject matter according to any one of examples 1 to 12, above.

By heating feedstock line 106 after it has been deposited by delivery guide 116, deposited-feedstock-line heater 140 suitably prepares feedstock line 106, which has already been deposited, for subsequent deposition and adhesion of feedstock line 106 against itself. For example, when a length of feedstock line 106 is cured, or at least partially cured, by curing mechanism 120, subsequent or simultaneous heating of the length of feedstock line 106 may facilitate adhesion between a subsequent layer of feedstock line 106 deposited against the length of feedstock line 106. In addition, heating feedstock line 106 after it has been deposited by delivery guide 116 may increase the degree of cure of feedstock line 106 and may be used to control cure kinetics or cure rate of resin 110 of feedstock line 106.

In some examples, deposited-feedstock-line heater 140 may utilize induction heating and/or resistive heating, for example, with deposited-feedstock-line heater 140 inductively and/or electrically coupled with elongate fibers 108 within feedstock line 106. Additionally or alternatively, deposited-feedstock-line heater 140 may comprise a radiative heater and/or a laser to heat feedstock line 106.

Referring generally to FIGS. 1 and 2 and particularly to FIG. 3, method 400 of additively manufacturing object 102 from feedstock line 106 is disclosed. Feedstock line 106 comprises elongate fibers 108, at least partially encapsulated in resin 110. Method 400 comprises (block 402) transforming resin 110 of feedstock line 106 from a first at least partially uncured state to a rigid at least partially uncured state. Feedstock line 106 and resin 110 are more rigid when resin 110 is in the rigid at least partially uncured state than when resin 110 is in the first at least partially uncured state. Method 400 further comprises (block 404) introducing feedstock line 106 into delivery guide 116 with resin 110 of feedstock line 106 in the rigid at least partially uncured state. Method 400 additionally comprises (block 406) transforming resin 110 of feedstock line 106 from the rigid at least partially uncured state to a second at least partially uncured state as feedstock line 106 passes through delivery guide 116 or as feedstock line 106 exits delivery guide 116. Feedstock line 106 and resin 110 are less rigid when resin 110 is in the second at least partially uncured state than when resin 110 is in the rigid at least partially uncured state. Method 400 also comprises (block 408) depositing feedstock line 106 along print path 114, with resin 110 in the second at least partially uncured state, using delivery guide 116. Method 400 further comprises (block 410) transforming resin 110 of feedstock line 106 from the second at least partially uncured state to an at least partially cured state after feedstock line 106 is dispensed from delivery guide 116 along print path 114. Resin 110 in the at least partially cured state is cured more than resin 110 in the second at least partially uncured state. The preceding subject matter of this paragraph characterizes example 14 of the present disclosure.

Method 400 therefore may be implemented to manufacture object 102 from feedstock line 106. Moreover, method 400 may be implemented to manufacture object 102 with elongate fibers 108 being oriented in desired and/or predetermined orientations throughout object 102, such as to define desired properties of object 102. Because elongate fibers 108 are encapsulated in resin 110, feedstock line 106 may be described as a prepreg feedstock line. In addition, because feedstock line 106 may have a significant length, feedstock line 106 may be coiled, or spooled, prior to being introduced into delivery guide 116. Accordingly, feedstock line 106 may need to be sufficiently flexible, or bendable, to be coiled without damage to elongate fibers 108, yet sufficiently rigid so that resin 110 does not flow and so that feedstock line 106 maintains its integrity as a continuous flexible line. However, the first at least partially uncured state of feedstock line 106 may be too flexible to be operably fed into and advanced through delivery guide 116 and may be too tacky, or sticky, to be operably handled by an associated system (e.g., system 300 herein) without gumming up, or otherwise soiling, component parts of the system. Accordingly, transforming feedstock line 106 from the first at least partially uncured state to the rigid at least partially uncured state facilitates the introduction of feedstock line 106 into and the passage of feedstock line 106 through delivery guide 116, without elongate fibers 108 buckling, breaking, or otherwise becoming damaged, and without resin 110 soiling an associated system (e.g., system 300 herein). Subsequently transforming feedstock line 106 from the rigid at least partially uncured state to the second at least partially uncured state as feedstock line 106 passes through delivery guide 116 or as feedstock line 106 exits delivery guide 116 results in feedstock line 106 being sufficiently flexible to be operatively deposited in three dimensions by delivery guide 116 to additively manufacture object 102. Depending on the properties of feedstock line 106, in some implementations of method 400, it may be beneficial to transform feedstock line 106 to the second non-rigid cured state as it passes through delivery guide 116. In other implementations of method 400, it may be beneficial to transform feedstock line 106 to the second non-rigid uncured state as it exits delivery guide 116. Finally, at least partially curing resin 110 from the second at least partially uncured state to the at least partially cured state, enables curing of object 102 as it is being manufactured, or in situ.

Referring generally to FIGS. 1 and 2 and particularly to FIG. 3, according to method 400, feedstock line 106 in the first at least partially uncured state has a shear modulus greater than 0.08 GPa and less than or equal to 0.1 GPa. Feedstock line 106 in the rigid at least partially uncured state has a shear modulus greater than 0.1 GPa. Feedstock line 106 in the second at least partially uncured state has a shear modulus less than or equal to 0.1 GPa. The preceding subject matter of this paragraph characterizes example 15 of the present disclosure, wherein example 15 also includes the subject matter according to example 14, above.

With 0.1 GPa as a threshold shear modulus, or rigidity, feedstock line 106, when rigidized by rigidizing mechanism 112, is sufficiently rigid to be introduced into delivery guide 116 without elongate fibers 108 buckling, breaking, or otherwise becoming damaged. Moreover, by when having a shear modulus below 0.1 GPa, feedstock line 106 may be deposited along a circuitous print path, e.g., print path 114 with curves in two or three dimensions. However, other threshold values of shear modulus may be utilized, such as based on the stiffness of elongate fibers 108, the number of elongate fibers 108 in a corresponding tow, a shape of feedstock line 106, a diameter of feedstock line 106, properties of resin 110, etc.

Referring generally to FIGS. 1 and 2 and particularly to FIG. 3, according to method 400, (block 402) transforming resin 110 of feedstock line 106 from the first at least partially uncured state to the rigid at least partially uncured state comprises (block 412) withdrawing heat from resin 110 of feedstock line 106 in the first at least partially uncured state. Also, (block 406) transforming resin 110 of feedstock line 106 from the rigid at least partially uncured state to the second at least partially uncured state as feedstock line 106 passes through delivery guide 116 or as feedstock line 106 exits delivery guide 116 comprises (block 414) heating resin 110 of feedstock line 106 in the rigid at least partially uncured state. The preceding subject matter of this paragraph characterizes example 16 of the present disclosure, wherein example 16 also includes the subject matter according to example 14 or 15, above.

Withdrawing heat from resin 110 of feedstock line 106 to transform it to the rigid at least partially uncured state cools resin 110 to a sufficient degree that its shear modulus, or rigidity, is sufficiently high for feedstock line 106 to be introduced into delivery guide 116 without elongate fibers 108 buckling, breaking, or otherwise becoming damaged. In some implementations of method 400, withdrawing heat from resin 110 may be described as freezing resin 110. Then, to reverse the rigidity of resin 110 and feedstock line 106, heating resin 110 to transform it to the second at least partially uncured state facilitates the operative deposition of feedstock line 106 by delivery guide 116 along print path 114.

Referring generally to FIGS. 1 and 2 and particularly to FIG. 3, according to method 400, (block 404) introducing feedstock line 106 into delivery guide 116 with resin 110 of feedstock line 106 in the rigid at least partially uncured state comprises (block 416) pushing feedstock line 106 into delivery guide 116 with resin 110 of feedstock line 106 in the rigid at least partially uncured state. The preceding subject matter of this paragraph characterizes example 17 of the present disclosure, wherein example 17 also includes the subject matter according to any one of examples 14 to 16, above.

By pushing feedstock line 106 into delivery guide 116, the feed mechanism (e.g., feed mechanism 126) of an associated additive manufacturing system (e.g., system 300 herein) may be positioned upstream of delivery guide 116, and thus out of the way of delivery guide 116 to operatively move relative to print path 114.

Referring generally to FIGS. 1 and 2 and particularly to FIG. 3, according to method 400, (block 416) pushing feedstock line 106 into delivery guide 116 is performed by opposing rollers or belts 128 that engage opposite sides of feedstock line 106 and selectively rotate to push feedstock line 106 through delivery guide 116. The preceding subject matter of this paragraph characterizes example 18 of the present disclosure, wherein example 18 also includes the subject matter according to example 17, above.

Opposing rollers or belts 128, when selectively rotated, act to frictionally engage feedstock line 106, thereby feeding it between opposing rollers or belts 128 and pushing it into and through delivery guide 116.

Referring generally to FIGS. 1 and 2 and particularly to FIG. 3, method 400 further comprises (block 418) sensing at least one physical characteristic associated with feedstock line 106. Method 400 also comprises, responsive to (block 418) sensing at least the one physical characteristic associated with feedstock line 106, (block 420) actively controlling at least one of (block 402) transforming resin 110 of feedstock line 106 from the first at least partially uncured state to the rigid at least partially uncured state, (block 404) introducing feedstock line 106 into delivery guide 116 with resin 110 of feedstock line 106 in the rigid at least partially uncured state, (block 406) transforming resin 110 of feedstock line 106 from the rigid at least partially uncured state to the second at least partially uncured state as feedstock line 106 passes through delivery guide 116 or as feedstock line 106 exits delivery guide 116, or (block 410) transforming resin 110 of feedstock line 106 from the second at least partially uncured state to the at least partially cured state after feedstock line 106 is dispensed from delivery guide 116 along print path 114. The preceding subject matter of this paragraph characterizes example 19 of the present disclosure, wherein example 19 also includes the subject matter according to any one of examples 14 to 18, above.

By sensing at least one physical characteristic associated with feedstock line 106, an implementation of method 400 may in real time control the rigidity of feedstock line 106, the feed rate of feedstock line 106, and the cure rate of feedstock line 106.

Referring generally to FIGS. 1 and 2 and particularly to FIG. 3, according to method 400, (block 420) actively controlling (block 402) transforming resin 110 of feedstock line 106 from the first at least partially uncured state to the rigid at least partially uncured state comprises (block 422) controlling rigidity of resin 110 in the rigid at least partially uncured state. The preceding subject matter of this paragraph characterizes example 20 of the present disclosure, wherein example 20 also includes the subject matter according to example 19, above.

By actively controlling transforming resin 110 from the first at least partially uncured state to the rigid at least partially uncured state, the rigidity of feedstock line 106 in the rigid at least partially uncured state may be controlled to ensure that feedstock line 106 is sufficiently rigid to be operatively introduced into and advanced through delivery guide 116.

Referring generally to FIGS. 1 and 2 and particularly to FIG. 3, according to method 400, (block 420) actively controlling (block 404) introducing feedstock line 106 into delivery guide 116 with resin 110 of feedstock line 106 in the rigid at least partially uncured state comprises (block 424) controlling a feed rate of feedstock line 106. The preceding subject matter of this paragraph characterizes example 21 of the present disclosure, wherein example 21 also includes the subject matter according to example 19 or 20, above.

By actively controlling introducing feedstock line 106 into delivery guide 116, the feed rate of feedstock line 106 may be controlled, such as to ensure that there is ample time to suitably rigidize feedstock line 106 prior to its introduction into delivery guide 116 and/or ample time to suitably de-rigidize feedstock line 106 prior to its operative deposition along print path 114 by delivery guide 116.

Referring generally to FIGS. 1 and 2 and particularly to FIG. 3, according to method 400, (block 420) actively controlling (block 406) transforming resin 110 of feedstock line 106 from the rigid at least partially uncured state to the second at least partially uncured state as feedstock line 106 passes through delivery guide 116 or as feedstock line 106 exits delivery guide 116 comprises (block 426) controlling rigidity of resin 110 in the second at least partially uncured state. The preceding subject matter of this paragraph characterizes example 22 of the present disclosure, wherein example 22 also includes the subject matter according to any one of examples 19 to 21, above.

By actively controlling transforming resin 110 from the rigid at least partially uncured state to the second at least partially uncured state, the second at least partially uncured state of feedstock line 106 may be controlled to ensure a sufficient flexibility of feedstock line 106 for operative deposition by delivery guide 116 along print path 114.

Referring generally to FIGS. 1 and 2 and particularly to FIG. 3, according to method 400, (block 420) actively controlling (block 410) transforming resin 110 of feedstock line 106 from the second at least partially uncured state to the at least partially cured state after feedstock line 106 is dispensed from delivery guide 116 along print path 114 comprises (block 428) controlling a cure rate of resin 110 of feedstock line 106. The preceding subject matter of this paragraph characterizes example 23 of the present disclosure, wherein example 23 also includes the subject matter according to any one of examples 19 to 22, above.

By actively controlling at least partially curing resin 110, the cure rate that is imparted to feedstock line 106 as object 102 is being manufactured may be controlled.

Referring generally to FIGS. 1 and 2 and particularly to FIG. 3, method 400 further comprises (block 430) heating print path 114 ahead of delivery guide 116 as delivery guide 116 deposits feedstock line 106 along print path 114. The preceding subject matter of this paragraph characterizes example 24 of the present disclosure, wherein example 24 also includes the subject matter according to any one of examples 14 to 23, above.

By heating print path 114 ahead of delivery guide 116 as delivery guide 116 deposits feedstock line 106 along print path 114, the surface against which feedstock line 106 is deposited is suitably prepared. For example, when feedstock line 106 is being deposited against a prior length of feedstock line 106 that has already been cured, or at least partially cured, heating of the prior length of feedstock line 106 facilitates wetting and adhesion between the two layers of feedstock line 106.

Referring generally to FIGS. 1 and 2 and particularly to FIG. 3, method 400 further comprises (block 432) heating feedstock line 106 after feedstock line 106 is deposited by delivery guide 116 along print path 114. The preceding subject matter of this paragraph characterizes example 25 of the present disclosure, wherein example 25 also includes the subject matter according to any one of examples 14 to 24, above.

By heating feedstock line 106 after it has been deposited by delivery guide 116, feedstock line 106, which has been deposited, is suitably prepared for subsequent deposition and adhesion of feedstock line 106 against itself. For example, when a length of feedstock line 106 is cured, or at least partially cured, subsequent or simultaneous heating of the length of feedstock line 106 may facilitate adhesion between a subsequent layer of feedstock line 106 deposited against the length of feedstock line 106.

Figure 5:
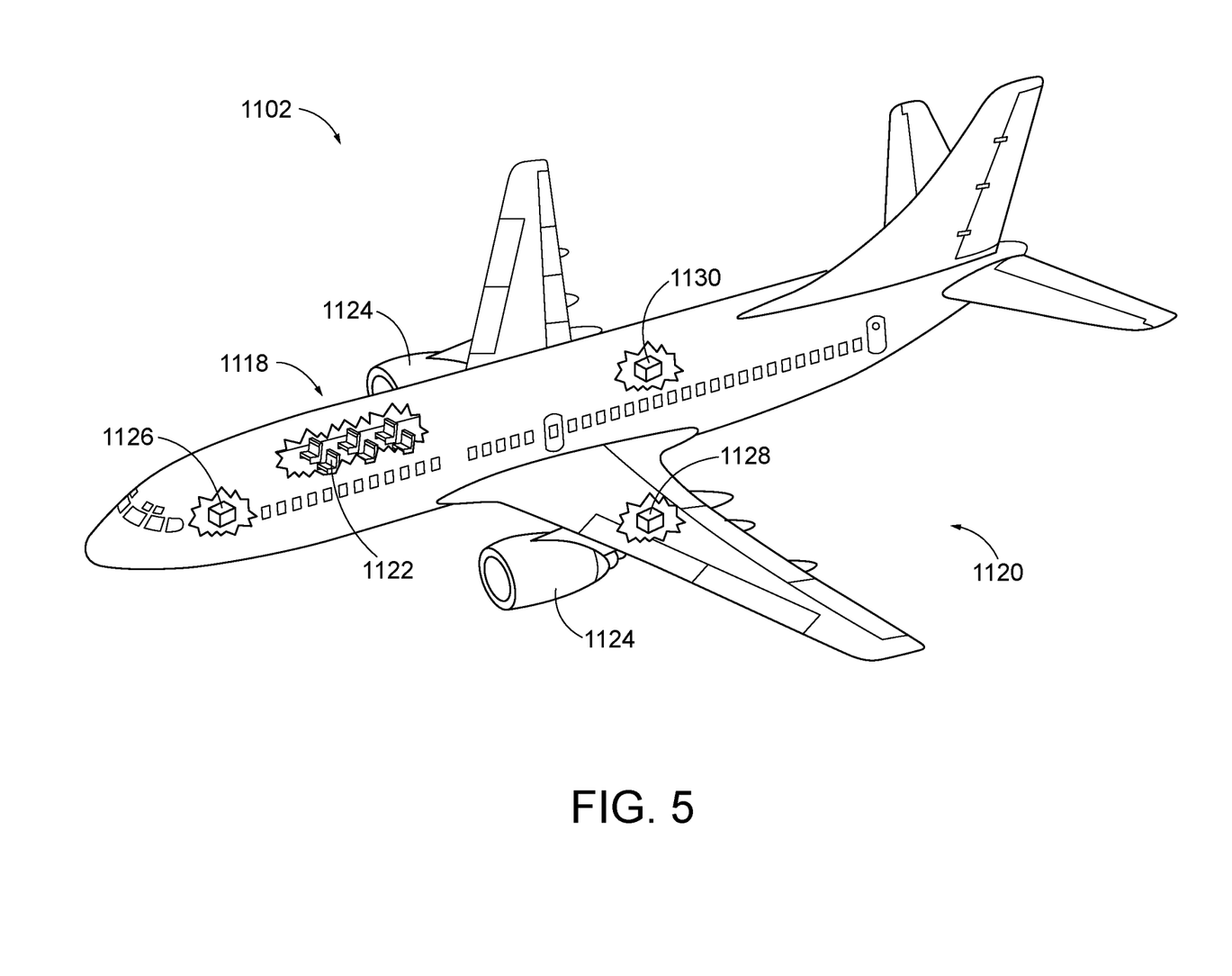
FIG. 5 is a schematic illustration of an aircraft.

Examples of the present disclosure may be described in the context of aircraft manufacturing and service method 1100 as shown in FIG. 4 and aircraft 1102 as shown in FIG. 5. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 5, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus (es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus (es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

The invention claimed is:

1. A method of additively manufacturing an object from a feedstock line, the feedstock line comprising elongate fibers at least partially encapsulated in a resin, the method comprising steps of:

transforming the resin of the feedstock line from a first at least partially uncured state to a rigid at least partially uncured state using a rigidizing mechanism, wherein the feedstock line and the resin are more rigid when the resin is in the rigid at least partially uncured state than when the resin is in the first at least partially uncured state, and wherein the resin of the feedstock line is transformed to the rigid at least partially uncured state prior to the feedstock line being pushed into a delivery guide by a feed mechanism;

introducing the feedstock line into the delivery guide with the resin of the feedstock line in the rigid at least partially uncured state by said pushing of the feedstock line into the delivery guide using the feed mechanism;

transforming the resin of the feedstock line from the rigid at least partially uncured state to a second at least partially uncured state using a de-rigidizing mechanism as the feedstock line passes through the delivery guide or as the feedstock line exits the delivery guide, wherein the feedstock line and the resin are less rigid when the resin is in the second at least partially uncured state than when the resin is in the rigid at least partially uncured state;

sensing at least one physical characteristic associated with rigidity of the resin of the feedstock line within the delivery guide, the at least one physical characteristic being selected from rigidity, stiffness, flexibility, hardness, and viscosity;

responsive to the step of sensing the at least one physical characteristic associated with the rigidity of the resin of the feedstock line within the delivery guide, actively controlling, in real time, (i) the rigidizing mechanism to control the step of transforming the resin of the feedstock line from the first at least partially uncured state to the rigid at least partially uncured state, and (ii) the feed mechanism to control a feed rate of the feedstock line being pushed into the delivery guide;

with the resin in the second at least partially uncured state, depositing the feedstock line along a print path using the delivery guide, wherein the step of actively controlling, in real time, the rigidizing mechanism and the feed mechanism ensures that the feedstock line is sufficiently flexible so that said deposition of the feedstock line by the delivery guide along the print path may be performed operatively; and transforming the resin of the feedstock line from the second at least partially uncured state to an at least partially cured state after the feedstock line is deposited by the delivery guide along the print path, wherein the resin in the at least partially cured state is cured more than the resin in the second at least partially uncured state.

2. The method according to claim 1, wherein:

the feedstock line in the first at least partially uncured state has a shear modulus greater than 0.08 GPa and less than or equal to 0.1 GPa;

the feedstock line in the rigid at least partially uncured state has a shear modulus greater than 0.1 GPa; and the feedstock line in the second at least partially uncured state has a shear modulus less than or equal to 0.1 GPa.

3. The method according to claim 1, wherein:

the step of transforming the resin of the feedstock line from the first at least partially uncured state to the rigid at least partially uncured state comprises withdrawing heat from the resin of the feedstock line in the first at least partially uncured state; and the step of transforming the resin of the feedstock line from the rigid at least partially uncured state to the second at least partially uncured state as the feedstock line passes through the delivery guide or as the feedstock line exits the delivery guide comprises heating the resin of the feedstock line in the rigid at least partially uncured state.

4. The method according to claim 1, wherein the step of actively controlling, in real time, the rigidizing mechanism and the feed mechanism further comprises actively controlling, in real time, (iii) the de-rigidizing mechanism to control the step of transforming the resin of the feedstock line from the rigid at least partially uncured state to the second at least partially uncured state as the feedstock line passes through the delivery guide or as the feedstock line exits the delivery guide.

5. The method according to claim 1 wherein the step of transforming the resin of the feedstock line from the second at least partially uncured state to the at least partially cured state after the feedstock line is deposited by the delivery guide along the print path is actively controlled, in real time, responsive to the step of sensing the at least one physical characteristic associated with rigidity of the resin of the feedstock line within the delivery guide, to control a cure rate of the resin of the feedstock line.

6. The method according to claim 1, further comprising heating the print path ahead of the delivery guide as the delivery guide deposits the feedstock line along the print path.

7. The method according to claim 1, further comprising heating the feedstock line after the feedstock line is deposited by the delivery guide along the print path.

8. The method according to claim 1, wherein the pushing the feedstock line into the delivery guide using the feed mechanism is performed by opposing rollers or belts that engage opposite sides of the feedstock line and selectively rotate to push the feedstock line through the delivery guide.

9. A method of additively manufacturing an object from a feedstock line, the feedstock line comprising elongate fibers at least partially encapsulated in a resin, the method comprising steps of:

transforming the resin of the feedstock line from a first at least partially uncured state to a rigid at least partially uncured state using a rigidizing mechanism, wherein the feedstock line and the resin are more rigid when the resin is in the rigid at least partially uncured state than when the resin is in the first at least partially uncured state, and wherein the resin of the feedstock line is transformed to the rigid at least partially uncured state prior to the feedstock line being pushed into a delivery guide by a feed mechanism ;

introducing the feedstock line into the delivery guide with the resin of the feedstock line in the rigid at least partially uncured state by said pushing of the feedstock line into the delivery guide using the feed mechanism;

transforming the resin of the feedstock line from the rigid at least partially uncured state to a second at least partially uncured state using a de-rigidizing mechanism as the feedstock line passes through the delivery guide or as the feedstock line exits the delivery guide, wherein the feedstock line and the resin are less rigid when the resin is in the second at least partially uncured state than when the resin is in the rigid at least partially uncured state;

sensing at least one physical characteristic associated with rigidity of the resin of the feedstock line within the delivery guide, the at least one physical characteristic being selected from rigidity, stiffness, flexibility, hardness, and viscosity;

responsive to the step of sensing the at least one physical characteristic associated with the rigidity of the resin of the feedstock line within the delivery guide, actively controlling, in real time, (i) the de-rigidizing mechanism to control the step of transforming the resin of the feedstock line from the rigid at least partially uncured state to the second at least partially uncured state, and (ii) the feed mechanism to control a feed rate of the feedstock line being pushed into the delivery guide;

with the resin in the second at least partially uncured state, depositing the feedstock line along a print path using the delivery guide, wherein the step of actively controlling, in real time, the de-rigidizing mechanism and the feed mechanism ensures that the feedstock line is sufficiently flexible so that said deposition of the feedstock line by the delivery guide along the print path may be performed operatively; and transforming the resin of the feedstock line from the second at least partially uncured state to an at least partially cured state after the feedstock line is deposited by the delivery guide along the print path, wherein the resin in the at least partially cured state is cured more than the resin in the second at least partially uncured state.

10. The method according to claim 9, wherein:
the feedstock line in the first at least partially uncured state has a shear modulus greater than 0.08 GPa and less than or equal to 0.1 GPa;
the feedstock line in the rigid at least partially uncured state has a shear modulus greater than 0.1 GPa; and
the feedstock line in the second at least partially uncured state has a shear modulus less than or equal to 0.1 GPa.

11. The method according to claim 9, wherein:
the step of transforming the resin of the feedstock line from the first at least partially uncured state to the rigid at least partially uncured state comprises withdrawing heat from the resin of the feedstock line in the first at least partially uncured state; and
the step of transforming the resin of the feedstock line from the rigid at least partially uncured state to the second at least partially uncured state as the feedstock line passes through the delivery guide or as the feedstock line exits the delivery guide comprises heating the resin of the feedstock line in the rigid at least partially uncured state.

12. The method according to claim 9, wherein the step of transforming the resin of the feedstock line from the second at least partially uncured state to the at least partially cured state, after the feedstock line is deposited by the delivery guide along the print path, is actively controlled, in real time, responsive to the step of sensing the at least one physical characteristic associated with rigidity of the resin of the feedstock line within the delivery guide, to control a cure rate of the resin of the feedstock line.

13. The method according to claim 9, further comprising heating the print path ahead of the delivery guide as the delivery guide deposits the feedstock line along the print path.

14. The method according to claim 9, further comprising heating the feedstock line after the feedstock line is deposited by the delivery guide along the print path.

15. The method according to claim 9, wherein the pushing the feedstock line into the delivery guide using the feed mechanism is performed by opposing rollers or belts that engage opposite sides of the feedstock line and selectively rotate to push the feedstock line through the delivery guide.

16. A method of additively manufacturing an object from a feedstock line, the feedstock line comprising elongate fibers at least partially encapsulated in a resin, the method comprising steps of:

transforming the resin of the feedstock line from a first at least partially uncured state to a rigid at least partially uncured state using a rigidizing mechanism, wherein the feedstock line and the resin are more rigid when the resin is in the rigid at least partially uncured state than when the resin is in the first at least partially uncured state, and wherein the resin of the feedstock line is transformed to the rigid at least partially uncured state prior to the feedstock line being pushed into a delivery guide by a feed mechanism;

introducing the feedstock line into the delivery guide with the resin of the feedstock line in the rigid at least partially uncured state by said pushing of the feedstock line into the delivery guide using the feed mechanism;

transforming the resin of the feedstock line from the rigid at least partially uncured state to a second at least partially uncured state using a de-rigidizing mechanism as the feedstock line passes through the delivery guide or as the feedstock line exits the delivery guide, wherein the feedstock line and the resin are less rigid when the resin is in the second at least partially uncured state than when the resin is in the rigid at least partially uncured state;

sensing at least one physical characteristic associated with rigidity of the resin of the feedstock line within the delivery guide, the at least one physical characteristic being selected from rigidity, stiffness, flexibility, hardness, and viscosity;

responsive to the step of sensing the at least one physical characteristic associated with the rigidity of the resin of the feedstock line within the delivery guide, actively controlling, in real time, (i) the rigidizing mechanism to control the step of transforming the resin of the feedstock line from the first at least partially uncured state to the rigid at least partially uncured state, (ii) the de-rigidizing mechanism to control the step of transforming the resin of the feedstock line from the rigid at least partially uncured state to the second at least partially uncured state, and (iii) the feed mechanism to control a feed rate of the feedstock line being pushed into the delivery guide;

with the resin in the second at least partially uncured state, depositing the feedstock line along a print path using the delivery guide, wherein the step of actively controlling, in real time, the rigidizing mechanism, the de-rigidizing mechanism, and the feed mechanism ensures that the feedstock line is sufficiently flexible so that said deposition of the feedstock line by the delivery guide along the print path may be performed operatively; and transforming the resin of the feedstock line from the second at least partially uncured state to an at least partially cured state after the feedstock line is deposited by the delivery guide along the print path, wherein the resin in the at least partially cured state is cured more than the resin in the second at least partially uncured state, and wherein the step of transforming the resin of the feedstock line from the second at least partially uncured state to the at least partially cured state, after the feedstock line is deposited by the delivery guide along the print path, is actively controlled, in real time, responsive to the step of sensing the at least one physical characteristic associated with rigidity of the resin of the feedstock line within the delivery guide, to control a cure rate of the resin of the feedstock line deposited by the delivery guide along the print path.

17. The method according to claim 16, wherein:

the feedstock line in the first at least partially uncured state has a shear modulus greater than 0.08 GPa and less than or equal to 0.1 GPa;

the feedstock line in the rigid at least partially uncured state has a shear modulus greater than 0.1 GPa; and the feedstock line in the second at least partially uncured state has a shear modulus less than or equal to 0.1 GPa.

18. The method according to claim 16, wherein:

the step of transforming the resin of the feedstock line from the first at least partially uncured state to the rigid at least partially uncured state comprises withdrawing heat from the resin of the feedstock line in the first at least partially uncured state; and the step of transforming the resin of the feedstock line from the rigid at least partially uncured state to the second at least partially uncured state as the feedstock line passes through the delivery guide or as the feedstock line exits the delivery guide comprises heating the resin of the feedstock line in the rigid at least partially uncured state.

19. The method according to claim 16, further comprising heating the print path ahead of the delivery guide as the delivery guide deposits the feedstock line along the print path.

20. The method according to claim 16, further comprising heating the feedstock line after the feedstock line is deposited by the delivery guide along the print path.

21. The method according to claim 16, wherein the pushing the feedstock line into the delivery guide using the feed mechanism is performed by opposing rollers or belts that engage opposite sides of the feedstock line and selectively rotate to push the feedstock line through the delivery guide.

\* \* \* \* \*